UNITED STATES PATENT OFFICE.

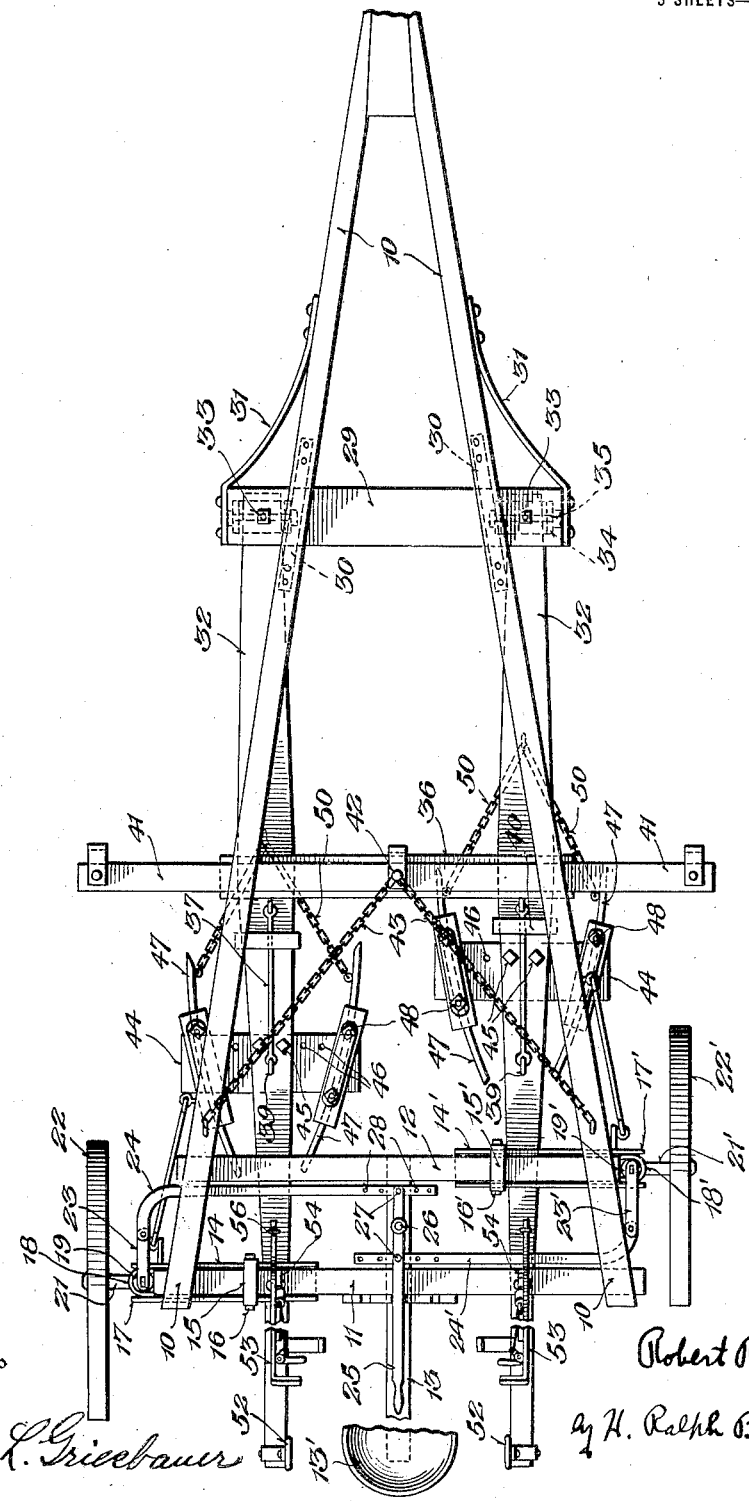

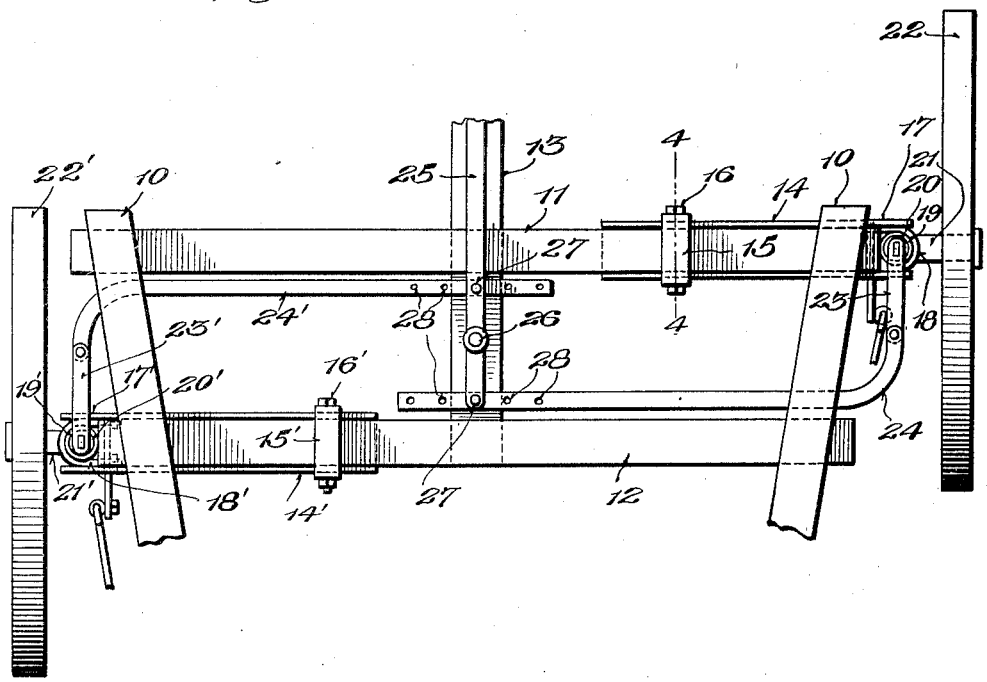
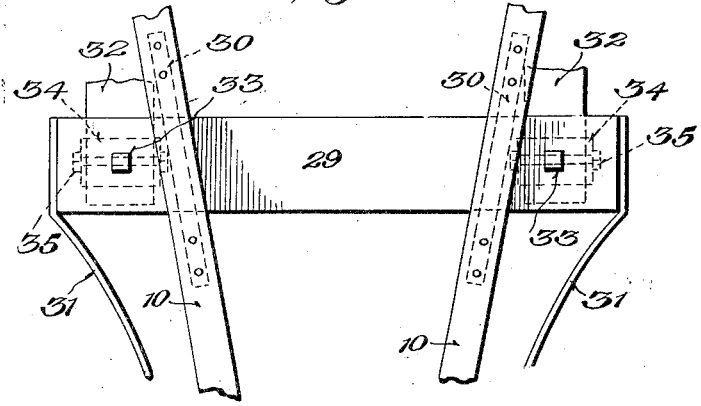
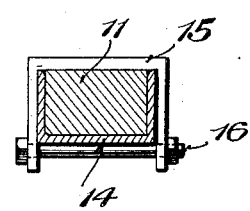

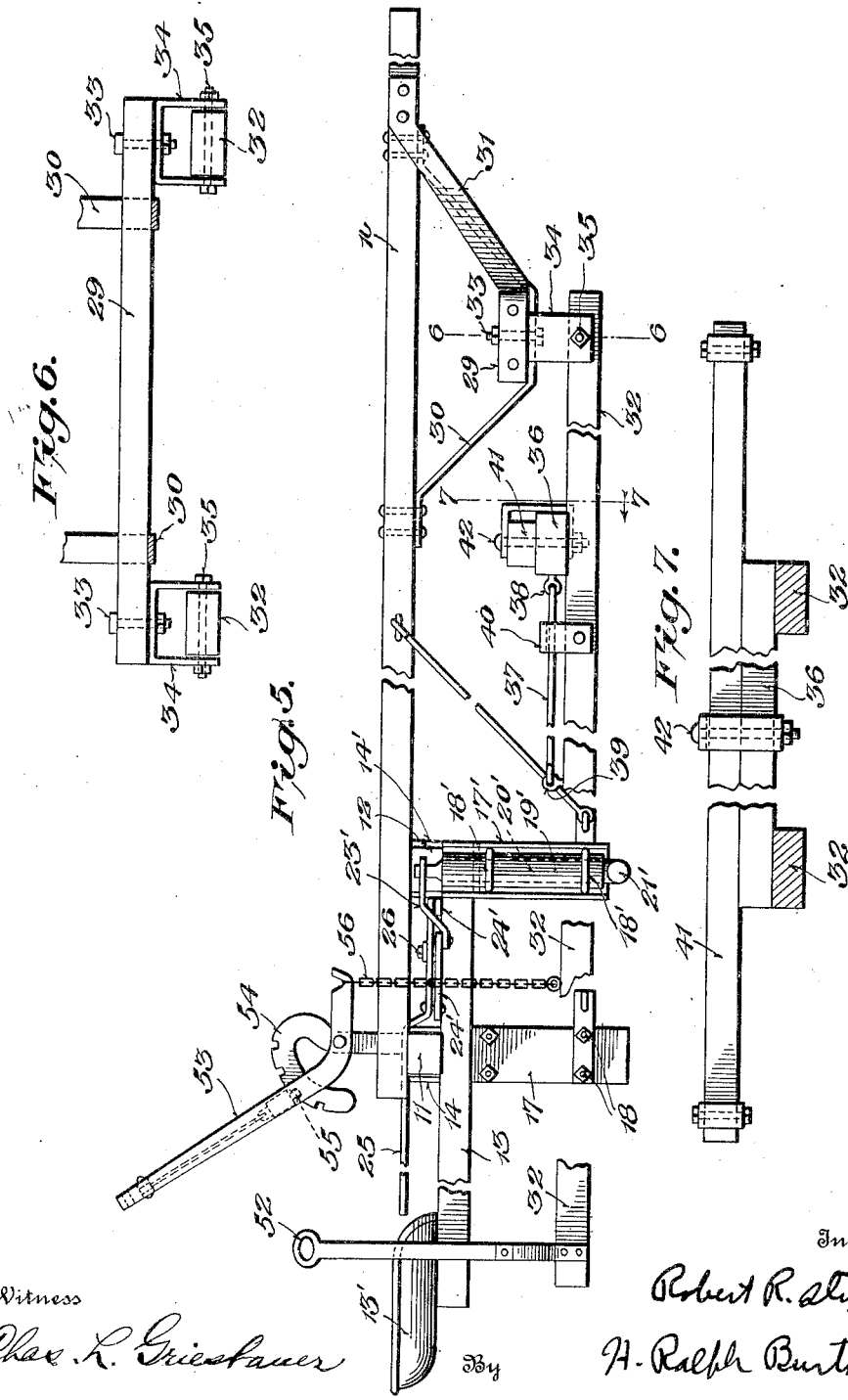

ROBERT R. SLIPP, OF FORT FAIRFIELD, MAINE.

GROUND-WORKING IMPLEMENT.

1,346,266.     Specification of Letters Patent.     Patented July 13, 1920.

Application filed December 29, 1919. Serial No. 348,004.

*To all whom it may concern:*

Be it known that I, ROBERT R. SLIPP, a citizen of Canada, residing at Fort Fairfield, in the county of Aroostook and State of Maine, have invented certain new and useful Improvements in Ground-Working Implements, of which the following is a specification, reference being had therein to the accompanying drawings.

This invention relates particularly to implements for hoeing potatoes and other tubers, but it is susceptible of adaptation to other implements.

It is an object of the invention to provide an implement of that class in which the ground-working parts may be adjusted as to distance apart so that they may be made to straddle or work in rows of different spacing, and in which they may be kept in the ground at the depth predetermined as necessary to meet the requirements.

Moreover, the implement includes means for raising the ground-working parts from working position and to support them while the implement is being moved from one place to another.

Means also are provided whereby the supporting-wheels may be turned from planes parallel to the line of draft, in order that the tendency of the implement to swerve from the rows being worked may be counteracted.

It also is an object of the invention so to arrange the parts that the distance between the supporting-wheels may be altered to meet varying requirements.

When read in connection with the description herein, the details of construction and arrangement of parts contemplated by the invention will be apparent from the accompanying drawings, forming part hereof, wherein an embodiment of the invention is disclosed, for purposes of illustration.

While the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the characteristics of the invention.

Like reference-characters refer to corresponding parts in the views of the drawings, of which—

Figure 1 is a plan view;

Fig. 2 is a plan view of the rear portion of the implement, on an enlarged scale;

Fig. 3 is a plan view of a forward portion of the implement;

Fig. 4 is a sectional view on the line 4—4, Fig. 2;

Fig. 5 is a side elevation, on an enlarged scale;

Fig. 6 is a sectional view on the line 6—6, Fig. 1; and

Fig. 7 is a sectional view on the line 7—7, Fig. 1.

Having more particular reference to the drawings, 10 designates pole members, which converge and are secured together at their front ends and are secured to and held in separated relation by a cross member 11 at the rear. Somewhat in advance of member 11, another cross member 12 is secured to the pole members, and a longitudinal member 13, carrying at its rear end an operator's seat 13', is secured to the two cross members. These parts form the main frame of the implement.

A channel member 14 embraces one end portion of the rear cross member 11, and it is held thereon by a clamp 15 and a bolt 16, the arrangement being such that, when the bolt is loosened, the outer end of the channel member may be extended more or less beyond the end of the cross member. On the outer end of the channel member 14 is a channel depending upright 17, in which is held by straps 18 a tubular casing 19, and mounted in the casing is the upright portion 20 of an axle member having at its lower end a spindle 21 on which is journaled a ground-wheel 22. An arm 23 extends forwardly from the upper end of the upright portion 20.

A channel member and other parts such as described for the rear cross member 11 are associated in similar manner with the opposite end portion of the cross member 12 and are designated by reference-characters 14' to 23', inclusive, the only difference being that the arm 23' extends rearwardly, instead of forwardly as in the case of the arm 23.

The wheels 22 and 22' are mounted in the manner described in order that they may be adjusted with respect to the line of draft to overcome tendency of the rear portion of the implement to swerve to one side or the other when working on a side hill or other inclined ground and also when the ground-working parts themselves are such as to give such tendency in the implement; and so that the distance between the wheels may be altered to accommodate the implement to use over rows of different spacing.

The wheels are moved to and held in adjusted positions with respect to the line of draft by rods 24 and 24' pivotally connected to the free ends of the arms 23 and 23', respectively, and to a lever 25 fulcrumed at 26 on the seat-supporting member 13 and having a handle within reach of an operator on the seat 13'. The rod 24 associated with the rear wheel is connected to the lever in front of its fulcrum and the rod 24' associated with the forward wheel is connected to the lever equidistant from and on the opposite side of the fulcrum. The rods 24 and 24' are connected to the lever by bolts 27 disposed through the parts. A plurality of bolt-holes 28 is provided in each rod in order that each bolt 27 may be shifted from one to another when the distance between the wheels is altered. When the operator swings the lever, the wheels will be turned or guided in accordance with the direction and amount of movement given the lever. Thus, for example, if the rear or handle portion of the lever is swung toward the right-hand side of the implement, the wheels will be guided toward the left to counteract tendency of the implement to swerve toward the right.

In the forward portion of the implement, a cross member 29 is supported below the pole members 10 by depending straps 30 bolted to the cross member intermediately of their ends and to the pole members at their ends, and by braces 31 bolted to the pole members and to the ends of the cross member.

The cross member 29 is for connection with and to space forward ends of draft members 32 with which the ground-working parts, yet to be described, are immediately associated. The draft members are connected in such manner that they may be swung both up and down and laterally in the implement. One suitable form of connection for this purpose includes a bolt 33 in the cross member 29, which pivots thereon a depending U-shaped member 34. A draft member extends and is held between the legs of the member 34 by a pivot-bolt 35.

A cross member 36 rests on the draft members to the rear of the member 29, and it is connected loosely with the draft members by links or rods 37 pivotally attached to the cross member by eye-bolts 38 and to the draft members by eye-bolts 39, the cross member being held down on the draft member by straps 40 secured to the latter and disposed over the links or rods. A doubletree 41 is pivoted centrally to the cross member 36 by a pin 42, and it is arranged to have whiffletrees attached to its ends to which draft-animals are hitched to draw the implement, a yoke for the animals being attached to the connected front ends of the pole members. In order to relieve the pivotal connection between the cross member 29 and the draft members 32 from draft of wheels 22 and 22', chains 43 are connected to the doubletree at its center and to the pole members 10 to the rear thereof.

A stub piece 44 is secured to each draft member to the rear of the cross member 36 by bolts 45, a plurality of sets of holes 46 being provided in each stub piece in order that it may be shifted laterally on the draft member to alter the relative positions of the ground-working parts 47 carried thereby. The parts 47 are potato-hoes or other elements to carry out the purpose for which the implement is intended, and they are carried by standards 48 secured at their upper ends to the ends of the stub pieces by connections 49. A chain 50 extends forwardly from the lower portion of each standard to the draft member on which it is mounted to take the drag sustained by the ground-working part when in the ground and the implement is in motion.

The draft members extend to the rear of the cross member 11, and in its rear portion each draft member has a stirrup 51 and an upstanding handle 52 secured thereto, by which an operator on the seat 13' can impose weight on the draft members by his feet and hands and keep the ground-working elements in the ground and swing them to maintain them in the rows being worked.

A hand-lever 53 is mounted on the cross member 11 above each draft member, and with it is associated a rack 54 and a finger-controlled detent 55 for holding the lever in adjusted positions. Each lever is connected by a chain 56 with the draft member below it, and the arrangement is such that by swinging the lever the draft member may be raised or lowered. Thus there is afforded means to raise and keep the ground-working elements out of the ground while the implement is being transported from place to place; and, by setting the levers in proper positions, the downward movement of the draft members, and of the ground-working elements into the ground, may be limited.

The wheel 22' is placed in advance of the wheel 22, as previously noted; and the ground-working elements are correspondingly set on the machine—that is, that on the same side as wheel 22' is in advance of the wheel on the other side. The ground-working elements are placed in that manner so that one row may be worked before another as the implement advances; and, by locating the wheels in correspondingly staggered positions, both of them are comparatively near the ground-working elements and in positions to sustain the downward stresses resulting from action of those elements in the ground.

It will be seen that the trailing or floating arrangement of the draft members enables the operator to swing either or both of them laterally to keep the ground-working elements in the rows when there is irregularity in alinement thereof or in their distance apart, relative movement of those parts being permitted by the loose connection thereof with the cross member 36, and that either the stub pieces 44 or the wheels 22 and 22', or both sets of those parts, may be shifted laterally to accommodate the implement to differently-spaced rows or to other conditions that may be met in the use of the implement.

Having thus described my invention, what I claim as new, and desire to secure by Letters Patent, is—

1. A ground-working implement comprising a main frame, a supporting-wheel mounted in one side of the rear portion of said frame, a cross member in the rear portion of said frame, a channel member shiftable longitudinally on said cross member, means whereby said members are held adjustably together, and a supporting-wheel on said channel member.

2. A ground-working implement comprising a main frame, a supporting-wheel mounted in one side of the rear portion of said frame, a cross member in the rear portion of said frame, a channel member shiftable longitudinally on said cross member having a depending end portion, an axle member rockable in said depending portion having a spindle extending laterally therefrom, a supporting-wheel on said spindle, and hand-operable means whereby to rock said axle member.

3. A ground-working implement comprising a main frame having cross members in its rear portion, a channel member shiftable longitudinally on the outer end portion of each of said cross members, means whereby said channel members are held adjustably on said cross members, a depending upright on the outer portion of each channel member, an axle member rotatable in each depending portion having a spindle extending laterally therefrom, supporting-wheels on said spindles, an arm extending from each of said upright axle portions, a hand-lever, and a connection between each of said arms and said lever.

In witness whereof, I affix my signature.

ROBERT R. SLIPP.